May 21, 1963  C. R. CUNNINGHAM ET AL  3,090,570
METHOD AND APPARATUS FOR FORMING AND COLLECTING FILAMENTS
Filed Dec. 29, 1958  4 Sheets-Sheet 1
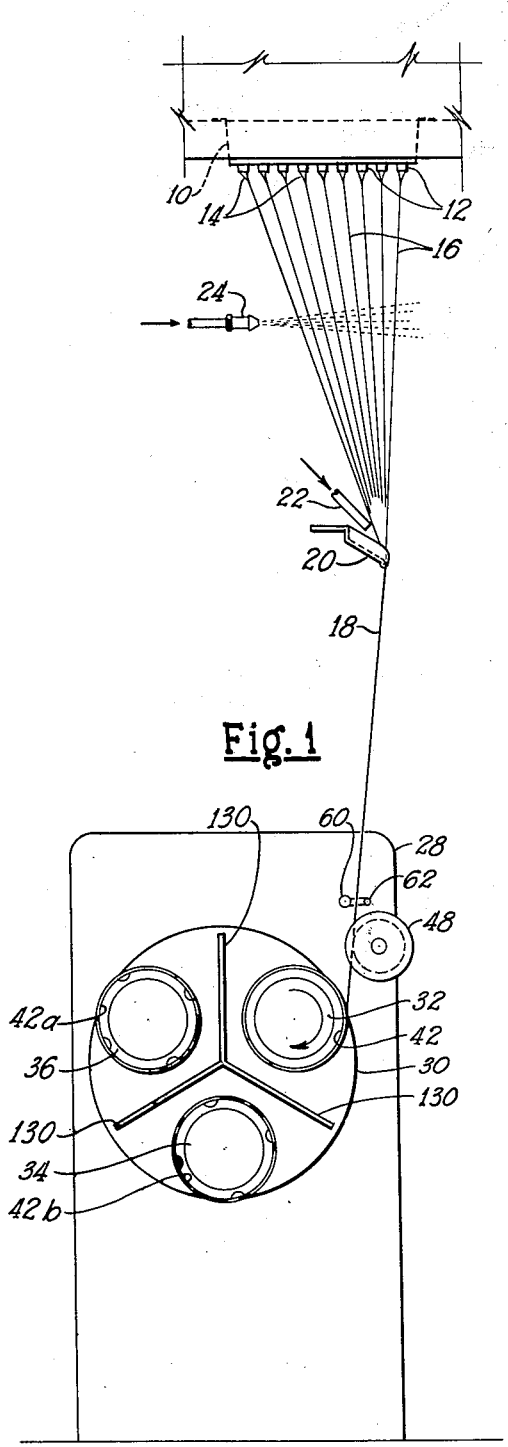
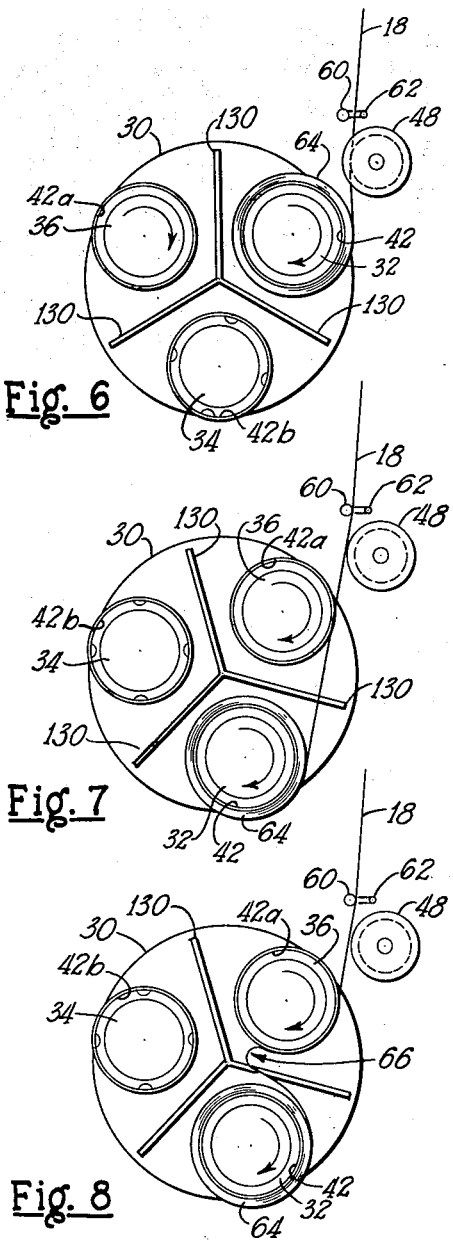
Cecil R. Cunningham,
Marshall D. Weiss &
Robert Z. Schreffler
INVENTORS
BY
ATTORNEYS

CECIL R. CUNNINGHAM,
MARSHALL D. WEISS &
ROBERT Z. SCHREFFLER
INVENTORS

BY
ATTORNEYS

May 21, 1963  C. R. CUNNINGHAM ET AL  3,090,570
METHOD AND APPARATUS FOR FORMING AND COLLECTING FILAMENTS
Filed Dec. 29, 1958  4 Sheets-Sheet 3

CECIL R. CUNNINGHAM,
MARSHALL D. WEISS &
ROBERT Z. SCHREFFLER
INVENTORS

BY
ATTORNEYS

May 21, 1963 C. R. CUNNINGHAM ET AL 3,090,570
METHOD AND APPARATUS FOR FORMING AND COLLECTING FILAMENTS
Filed Dec. 29, 1958 4 Sheets-Sheet 4

CECIL R. CUNNINGHAM,
MARSHALL D. WEISS &
ROBERT Z. SCHREFFLER
INVENTORS

BY
ATTORNEYS

United States Patent Office 3,090,570
Patented May 21, 1963

3,090,570
METHOD AND APPARATUS FOR FORMING AND COLLECTING FILAMENTS
Cecil R. Cunningham, Anderson, S.C., Marshall D. Weiss, Riverside, R.I., and Robert Z. Schreffler, Anderson, S.C., assignors to Owens-Corning Fiberglas Corporation, Toledo, Ohio, a corporation of Delaware
Filed Dec. 29, 1958, Ser. No. 783,432
16 Claims. (Cl. 242—18)

This invention relates to method of and apparatus for forming filaments or fibers from attenuable materials and more especially to a method of and apparatus for continuously and automatically collecting a strand or strands of newly formed filaments attenuated from heat-softened glass or other heat-softenable materials or fiber-forming resins wherein the filaments are drawn or attenuated from streams of heat-softened material by winding or collecting a strand of the filaments upon a winding tube or collector rotating at a high speed, and upon completion of a wound package of strand, doffing the same and initiating the winding of a new package automatically without interrupting the linear movement of the filaments being formed.

It has been a conventional practice, particularly in the formation of strands of filaments from heat-softened glass to wind the strand of filaments upon a rotating sleeve at a speed desired for the attenuation of filaments of a particular diameter and when the package of wound strand is completed, the attenuation and winding operation is interrupted by the operator deenergizing the motor rotating the collecting sleeve or spool, bringing the spool or sleeve to a condition of rest, breaking the strand of filaments manually, and removing the strand package from the winding collet.

The operator places a strand-free sleeve or collector upon the collet and initiates rotation of the collet to reestablish attenuation of filaments by winding. During the start-up or initial period of rotation of the collet and sleeve, the filaments formed are of larger size than desired and are of varying size until the collet is brought up to the required winding speed.

During this period the filaments of improper size are initially wound upon an extension of the collet until the collet reaches the desired winding speed at which time the operator moves the strand manually into cooperative association with a traverse means which performs the function of distributing the strand material lengthwise of the sleeve or collector in superposed layers in the formation of a complete package. When the package is completed and rotation ceases, the operator removes the initially wound strand from the collet which is discarded as waste material, Another major difficulty is encountered in this method of winding for the reason that the diameter of the wound package increase progressively which effects a progressively increasing linear speed of the filaments. This condition results in a strand of filaments wherein the filaments are of constantly diminishing size so that the strand in the finished package is of varying diameter or size.

Various means and methods have been employed to alleviate this condition but most have been unreliable and not entirely satisfactory. The above described method, because of the periodic requirement of stopping the operation to manually remove a completed package and install a strand-free sleeve, requires the constant attention of an operator to perform the above-mentioned operations at the completion of each package.

Such method periodically impairs the flow characteristics of the glass at the supply and results in considerable waste of strand material at each start-up of a package and appreciable time is required to reestablish proper attenuating conditions for the production of usable filaments.

The present invention embraces a method of and apparatus for forming and packaging continuous filaments of heat-softenable material such as glass wherein the packaging operation or collection of a strand of the filaments is continuously carried on without interrupting attenuation of the filaments during formation whereby continuous filaments are produced or attenuated of a proper size with a minimum of waste material produced during the operation.

An object of the invention is the provision of a method of carrying on continuous winding of a strand of filaments and continuous attenuation of the filaments during automatic transition or transfer of the strand or group of filaments from a completed package onto an empty sleeve or collector.

Another object of the invention is the provision of a method of continuously collecting or packaging linear material such as a strand or group of newly formed filaments and at the completion of a package, of transferring the strand from a completed package onto an empty or strand-free sleeve or collector, and establishing a differential in speed of rotation between a completed package and the empty collector whereby a loop of strand is formed and adhered to the empty collector in a manner to effect a breaking or fracture of the strand without the use of strand severing means or devices.

Another object of the invention is the provision of a method of and apparatus for continuously winding a strand of filaments as they are attenuated onto a rotating collector or tube wherein the progressively increasing size of the package is compensated in a manner whereby continuous attenuation of the filaments is carried on without interruption at a substantially constant speed whereby to produce filaments of uniform size.

Another object of the invention resides in the provision of a novel guide or traverse means for guiding or distributing the strand lengthwise of a collector or tube formed of material which resists licking or the tendency of the strand to adhere to the traverse whereby transition or transfer of the strand from a completed package to an empty sleeve may be automatically accomplished by temporary disengagement of the strand from the traverse means.

Another object of the invention is the provision of a filament guiding means fashioned of material which does not become polished when engaged with filaments moving at comparatively high linear speeds.

Another feature of the invention resides in the provision of an indexable head equipped with multiple winding collets for supporting winding collectors or tubes wherein the package being wound is isolated by partition means from the other collets and a completed package for preventing or retarding deposition of spray or coating material by centrifugal forces of rotation upon a finished package from the wet strand being collected upon a sleeve or tube.

Another object of the invention resides in electrically actuated and controlled means for varying the speed of the sleeve upon which the strand is being collected during package formation to compensate for the increased diameter of the package and for actuating or controlling the indexing mechanism and traverse actuating means to automatically correlate the several steps or operations of the method in proper sequence and timing whereby the winding of successive packages is carried on automatically without interruption of attenuation of the filaments.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a front elevation view illustrating semi-diagrammatically a form of winding apparatus of the invention as employed in concomitantly attenuating and winding filaments formed from streams of heat-softened material;

FIGURE 6 is a schematic view illustrating the method step of collecting or winding linear material such as a strand of filaments to form a package, the package being illustrated as substantially completed;

FIGURE 7 is a schematic view illustrating an indexing movement of the collet supporting head with a completed package moving away from winding position and an empty sleeve being brought into winding position;

FIGURE 8 is a schematic view illustrating the formation of a loop of strand during transition or transfer of the strand from a completed package onto an empty sleeve or tube;

Figures 12, 13:
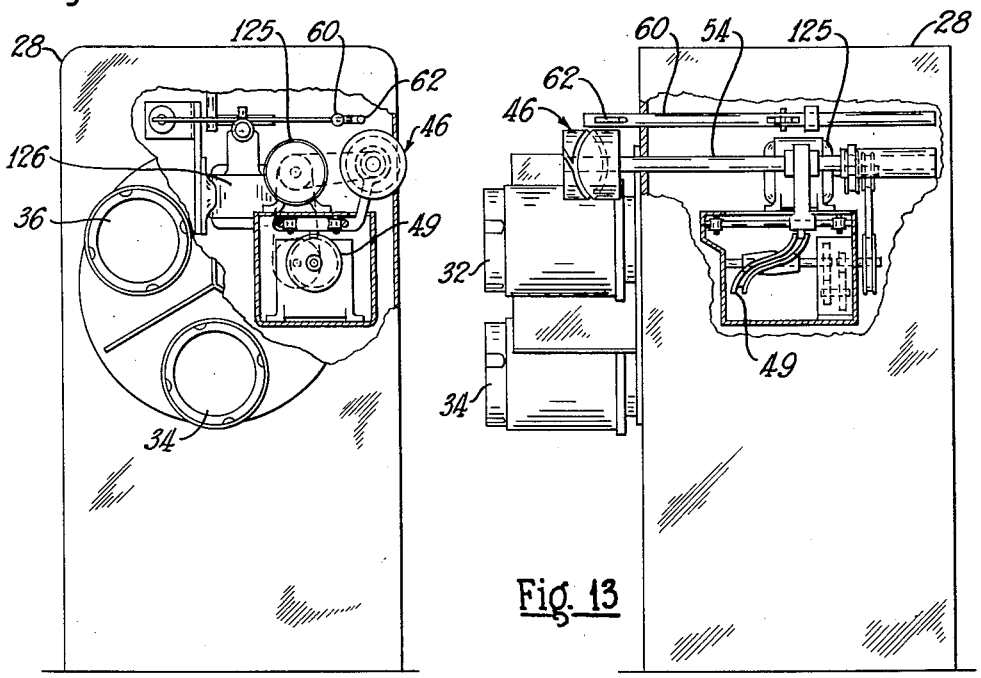

FIGURE 12 is a front elevational view of the winding apparatus, portions of the housing thereof being broken away illustrating an arrangement for reciprocating the strand transfer means and for rotating and reciprocating the strand traverse or guide means, and FIGURE 13 is a side elevational view of the winding apparatus with a portion of the housing broken away illustrating the arrangement for rotating and reciprocating the strand traverse or guide means.

While the method and apparatus of the invention are particularly adaptable for continuously attenuating streams of heat-softened mineral material such as glass into fine continuous filaments and winding a strand of filaments into package formation, it is to be understood that the method of and apparatus for continuously collecting advancing strand or linear material into successive packages may be utilized for packaging other linear material or textile elements, monofilaments, yarns or threads fashioned of any type of fibers or filaments including those formed from fiber-forming resins or other mineral materials such as molten slag or fusible rock.

Referring to the drawing in detail, and particularly to FIGURE 1, there is illustrated a feeder 10 containing heat-softened fiber-forming material such as molten glass which is supplied by any suitable means from a melting apparatus (not shown or the feeder may be connected with a forehearth of a melting furnace. The feeder is provided with a comparatively large number of tips or projections 12 arranged in the bottom wall or floor of the feeder 10 and each of the projections formed with an orifice or outlet through which glass or other fiber-forming material in the feeder is discharged in fine streams 14.

The streams are continuously attenuated or drawn into fine filaments or fibers 16, the number of filaments drawn from a single feeder being dependent upon the number of filaments desired in a strand, and a single strand may contain upwards of four hundred or more filaments drawn from streams from a single feeder. The feeder 10 is formed of platinum rhodium or other material capable of withstanding the intense heat required to maintain the glass or other material in the feeder in a flowable condition.

The feeder may be connected with a source of electrical energy of high amperage and low voltage for heating the glass or other material within the feeder and the electrical energy controlled so as to maintain the material in the feeder at a proper viscosity so that the streams of glass flowing through the orifices in the tips 14 will be substantially uniform.

The filaments drawn from the streams of glass or other material are continuous and are brought into converging relation to form a strand 18 by means of a guide member 20 which may also be utilized to deliver a lubricant or other coating material onto the newly formed filaments. The member 20 is of trough-like configuration and a tube 22 is arranged above the member 20 and is connected with a supply of lubricant or other filament coating material which is delivered into the trough-like member 20 and is transferred onto the strand 18 by the wiping action of the filaments engaging the extremity of the member 20.

The supply of lubricant or coating material delivered through the tube 22 may be regulated by means (not shown) in accordance with the amount of lubricant transferred to the filaments. It is essential in the production of fine filaments usable for textile strands or materials to maintain an uncontaminated atmosphere at the region of attenuation or formation of the filaments beneath the feeder 10 because the newly formed filaments seize upon foreign particles in the atmosphere and tend to cause break-outs or fracture of the filaments.

In order to reduce or prevent contamination in the region of attenuation, one or more spray nozzles 24 may be employed for delivering fine sprays or mist of water or other fluid in or adjacent the attenuating region for purging the ambient atmosphere of foreign particles.

The winding or package forming apparatus of the invention is inclusive of a housing 28 which encloses the mechanical and electrical actuating means for carrying out or performing the several steps in the method of the invention. Journally supported upon the housing in suitable bearings (not shown) is a circular member or head 30 which is rotatable and, in the embodiment illustrated is adapted to be indexed or moved to three positions in the performance of winding operations for purposes hereinafter explained.

The indexable head 30 journally supports three collets or arbors designated respectively 32, 34 and 36 which are spaced circumferentially equal distances apart and their axes of rotation disposed at equal radial distances from the axis of rotation of the indexing head 30. The head 30 is adapted or arranged to be moved to its successive indexed positions by means of an indexing motor 40 shown schematically in the circuit diagram of FIGURE 9 for the purpose of successively moving empty or strand-free collectors or tubes into strand collecting position and moving completed packages away from winding position.

The strand 18 is adapted to be wound upon comparatively thin sleeves or tubes, and for purposes of explanation the sleeves carried by the respective collets are deignated 42, 42a and 42b. The sleeves or collectors slidably fit on the driving arbors or collets and are adapted to be rotated at comparatively high speed for winding the strand of filaments, the winding operation simultaneously forming or attenuating the streams of glass to filaments of the strand. Each of the collets 32, 34 and 36 are driven by individual electrically energizable motors or other suitable means individual to each collet.

The collets are provided with friction shoes (not shown) or other suitable means engageable with the interior surfaces of the sleeves or collectors to effect a driving connection. The arrangement of the invention includes a strand distributing means or traverse means 46 adapted for movement in directions to distribute the strand lengthwise of a collector or sleeve for building up a package of strand in which successive layers are deposited or wound upon the collector throughout a major length of a collector sleeve.

Figure 4:
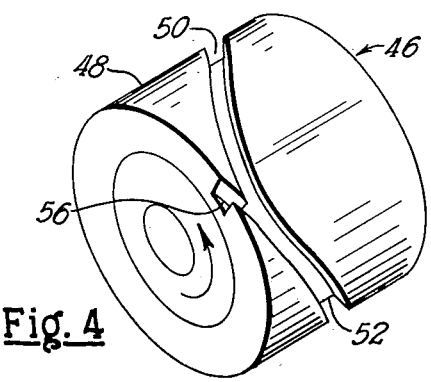
FIGURE 4 is an isometric view illustrating a form of strand traverse or guide means forming a component of the invention.

In the embodiment illustrated, the traverse means or strand guide is in the form of a circular cylindrically shaped member 48 having its peripheral region formed with a cam slot, recess or groove 50, the base of which is defined by a cylindrical portion 52 of reduced diameter as shown in FIGURE 4. The strand of filaments 18 is engaged in the groove 50 for guiding the strand onto a collector sleeve. The groove 50 is preferably of the uniform motion type or shape whereby during rotation of the traverse member 48, the strand is wound upon the collector in large overlapping helixes or convolutions in crossing, nonparallel relation.

By forming the layers of strand in the package with successive convolutions of strand in crossing relation, the tendency of the strands to adhere together is reduced to a minimum so that the liability of strand breakage when the strand is unwound from the package in subsequent processing operations, is greatly reduced. The traverse member 48 is supported upon a shaft 54 which is rotated by a motor 125 and reciprocated lengthwise of the collets by suitable cam means 49 of conventional construction for distributing the strand on a collector sleeve. An arrangement of the character disclosed in the patent to Stream 2,433,304 which is illustrated in FIGURES 12 and 13 herein may be utilized for rotating and reciprocating the strand traverse means 46. The details of construction illustrated in FIGURES 12 and 13 form no part of the present invention.

As particularly shown in FIGURE 4, an end region of the member 48 is formed with a reentrant slot or recess 56 which is located on the member 48 at the region of the closest approach of the groove 50 to the left-hand end of the traverse member as viewed in FIGURE 4. The reentrant slot 56 is in registration with the groove or slot 50 and is for the purpose of reengaging the strand in the groove 50 after transfer of the strand is effected from a completed strand package onto a fresh or empty collector.

Figure 11:
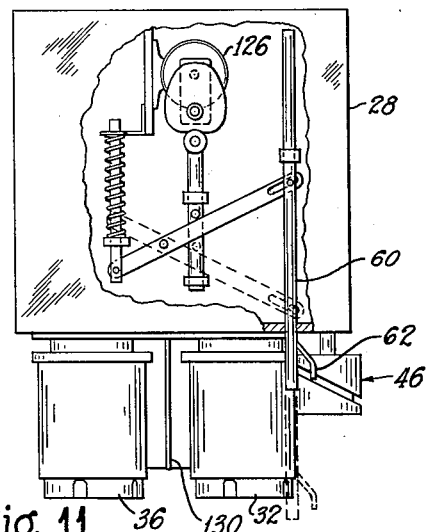
FIGURE 11 is a top plan view of the construction shown in FIGURE 3 with portions broken away illustrating an arrangement for reciprocating the strand transfer means.

The apparatus is inclusive of a secondary strand guiding or engaging member 60 which, in the embodiment illustrated, is in the form of a rod or shaft supported by means contained within the housing 28 and which is adapted to be reciprocated periodically by means contained within the housing 28. The rod 60 is provided with an angularly extending projection 62 which, when the rod 60 is moved in a left-hand direction as viewed in FIGURES 2 and 3, engages the strand 18 and moves it radially away from the traverse member and lengthwise of the winding sleeve to a point beyond the distal end of the traverse member 48 and out of the path of the traverse means. The arrangement for reciprocating the strand engaging member or rod 60 may be of the character shown in the patent to Stephens et al. 2,846,157 as illustrated in FIGURES 11, 12 and 13 and herein. The motor 126 actuates the cam and lever arrangement for reciprocating the rod 60, the details of this mechanism forming no part of the present invention.

This action takes place during the transition or transfer of the strand from a completed package onto an empty collector sleeve 42. The traverse member 48 is of particular construction hereinafter described in detail.

FIGURES 6, 7 and 8 illustrate three steps in the method of forming a strand package in moving the completed strand package away from winding position, initiating the start of strand winding upon an empty collector or tube and forming a loop to break the strand. As shown in FIGURE 6, the sleeve 42 forms a core of a completed strand package 64 and the arrangement is in a position to shift the completed package 64 away from winding position by an indexing movement of the head 30.

The controls and actuating mechanisms for carrying on the winding operation, controlling the reciprocation of the rod 60, actuating the traverse means and indexing the head 30 to effect a transition or transfer of the strand from a completed package onto an empty sleeve or collector will be hereinafter more fully described. FIGURE 7 illustrates the movement of the indexing head 30 toward a position moving the completed strand package 64 away from winding position and moving the collet 36 carrying an empty sleeve or collector 42a into winding position, the rod 60 having been moved so as to disengage the strand 18 from the traverse member 48.

FIGURE 8 illustrates the position of a completed package 64 away from the winding station and engagement of the strand with the empty sleeve 42a at the period of formation of a loop 66 in the strand between the completed package and the sleeve 42a at the start of the winding of the strand on the sleeve 42a. The formation of the loop comprises a step in the method of effecting breakage or fracture of the strand between the finished package 64 and the empty sleeve 42a in a manner hereinafter explained.

An important feature of the invention resides in the effective control of the speeds of the winding collets as several steps in the method are dependent upon the accurate control of the collet speeds during strand winding operations and the control of differentials in collet speeds during transfer of the strand from a finished package to an empty sleeve to effect fracture of the strand.

In the embodiment illustrated, the speed of the collector and collet upon which the strand is being wound is progressively decreased as the package of strand builds up so that the increase in diameter of the package does appreciably modify or affect the linear speed of the strand 18 so that the filaments are of uniform size. At the time or period in the winding operation in which the strand package approaches completion, the collet 36 is rotated to bring the sleeve 42a up to a peripheral speed which is equal to the linear speed of the strand 18.

This step is essential so that when the indexing head 30 moves the sleeve 42a into a position to receive strand as shown in FIGURE 7, the peripheral speed of the sleeve 42a must be substantially the same as the linear speed of the strand 18 in order to successfully transfer the strand without interruption of attenuation. As the indexing head 30 moves toward the position to bring the empty sleeve 42a to the winding station, the motor driving the collet 32 supporting the completed package 64 is deenergized and braking means applied as hereinafter explained causing a slowing down of the rotation of the package 64.

This action of establishing differential speed between the collet 36 and the collet 32 forms the loop 66 by reason of the fact that the strand 18 tends to "lick" or adhere to the periphery of the empty sleeve 42a as illustrated in FIGURE 8. The slack condition of the strand in the formation of the loop 66 continues so that the strand of the loop follows around the periphery of the sleeve 42a, the advancing strand 18 crossing the loop thus effecting a snubbing or binding of the strand of the loop to the periphery of the sleeve 42b with sufficient friction or force whereby to cause the strand to be fractured or broken.

In this manner, the trailing region of the strand on the finished package 64 is separated from the strand being wound upon the sleeve 42a. The transfer of the strand from a completed package onto an empty sleeve, the formation of the loop in the strand and the breaking of the strand are accomplished without any variation in the linear speed of the advancing strand 18.

The formation of the loop 66 and the initial winding of strand upon the empty sleeve 42a occurs at a peripheral end region of the sleeve 42a out of the path of reciprocation of the traverse member 48, the strand being held in such position by the projection 62 on the strand guiding rod 60.

Figure 2:
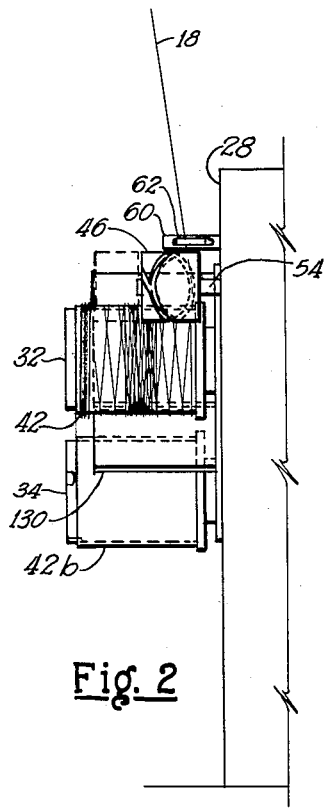
FIGURE 2 is a side elevational view of the multiple collet winding head construction illustrated in FIGURE 1.
Figure 3:
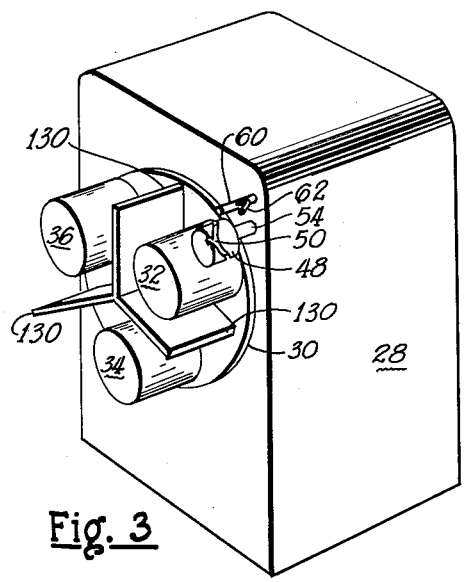
FIGURE 3 is an isometric view illustrating the multiple collet winding head and an arrangement of strand traverse means and strand control member.
Figure 5:
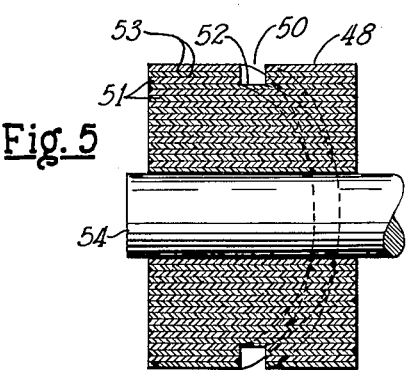
FIGURE 5 is a sectional view of the traverse means illustrated in FIGURE 4.

After the initiation of the winding of strand on the fresh sleeve 42a, the rod 60 is retracted in a right-hand direction as viewed in FIGURE 2 by means contained within the housing 28 so as to permit reentry of the strand 18 through the reentrant slot 56 and into the groove 50 of the rotating traverse 48. During the remainder of the period in which a package is being formed on the sleeve 42a, the strand is distributed over the sleeve by the combined rotational and reciprocatory movements of the traverse member 48. The construction of the strand-guiding traverse member 48 forms an important feature in the successful operation of the apparatus. The rotatable strand guiding traverse means is fashioned of material which does not set up appreciable friction upon contact with the rapidly moving strand to avoid "break outs" and is of a character which prevents the strand from "licking" or adhering thereto. It has been found that a material which becomes polished upon continued contact with the moving strand fosters "licking" or adherence of the strand to the material.

An important factor in preventing polishing of the guide means or traverse by the textile element resides in the provision of an erodible material such as a resin matrix or body filled with a material which is more resistant to wear or relatively less erodible than the resin component whereby erosion of the resin provides minute pockets or recesses between adjacent projections or particles of the filler acting as retaining recesses for sizing material, liquids or other fiber-coating or lubricating fluids.

One material which has been found satisfactory for use as a traverse member 48 is a resin-textile laminate commercially known as Micarta. The resin component 51 is a phenolic resin which bonds layers of fibrous material or textile 53 in an integrated unit. The fibrous or textile component of the unit may be fine linen, coarse cotton duck, glass fabric, either formed of chopped strand or chopped woven cloth of glass fibers.

The Micarta unit is formed by superposing the layers of textile or fibrous material in close relation and the layers or laminations impregnated with phenolic resin. The laminating layers of textile or fibrous material may be flat or disposed in successive convolutions. The cylindrically shaped traverse member such as that shown at 48 is cut from a block of the Micarta laminate with flat layers of textile or fibrous material parallel with the axis of the cylindrical member 48.

A laminated structure is most desirable because the fibrous or textile filler forms a high strength structure which is essential for high speed rotation. The traverse formed of Micarta does not become polished by engagement with a rapidly moving strand of glass filaments and it is believed that the non-polishing characteristic ensues by reason of the presence of the fabric or fibrous laminate material in the unit.

Under the high speed travel of a strand of filaments engaging the Micarta traverse the resin component of the unit erodes or abrades at a faster rate than the textile or fibrous component and minute projections of the textile or fibrous component extend above the resin. Thus minute recesses are provided by the erosion of the resin which hold moisture, preventing a polish of the surface or area engaging the rapidly moving strand.

The Micarta material may be utilized for other forms of strand guiding or bearing means other than the cylindrical traverse member 48 illustrated in FIGURE 4 such as a stationary guide or bearing formed to provide a groove to receive the strand. The groove 50 in the traverse member 48 is preferably of a uniform motion configuration to avoid variable rate of distribution of the strand on the collecting sleeve and thereby obtain a uniform build up of the strand in the package.

The rotation of the traverse means 46 distributes the strand on the collector in high angle overlapping helixes whereby succeeding convolutions of the strand are not in parallel relation so as to prevent adherence or bonding of the convolutions of strands together. This rotation of the traverse means is referred to as secondary or microtraverse motion which is a high frequency, low amplitude motion.

The reciprocating action or axial movement of the traverse member 48 is referred to as a primary traverse, macrotraverse or low frequency motion. Thus the macrotraverse movement or reciprocation of the traverse member 48 is at a much lower frequency than the comparatively high frequency distribution established by rotation of the traverse member 48.

Figure 9:
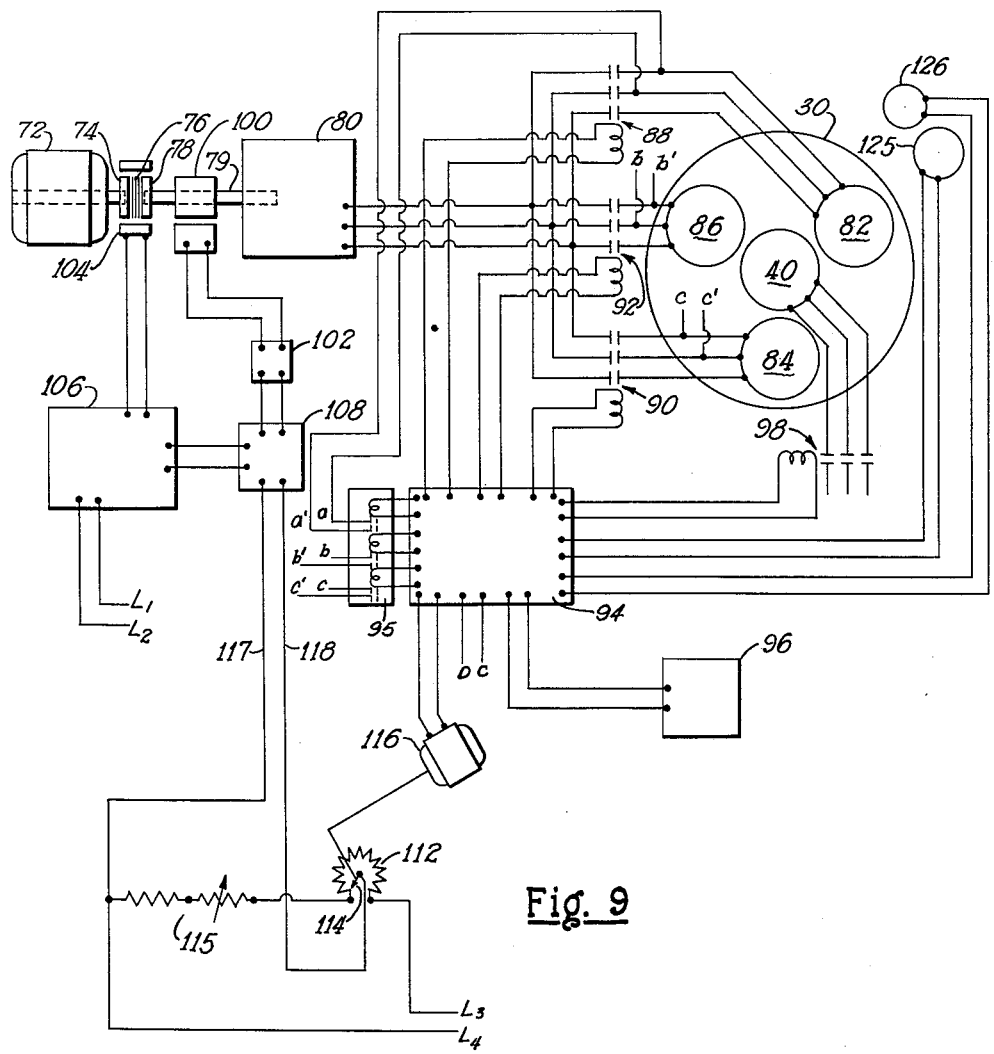
FIGURE 9 is a schematic view of the circuits and electrically actuated and controlled components for initiating and carrying on the steps in the method in proper sequence in effecting continuous and automatic collection and packaging of linear material.
Figure 10:
FIGURE 10 is a plan view of a strand transfer means.

FIGURE 9 illustrates the circuits and actuating and control components for effecting the several steps or operations in the method in their proper sequence providing for full automatic operation of the method of winding involving successive cycles of forming a complete package.

The method includes indexing the collet carrying head to successive positions to bring an empty sleeve into winding position, effecting a breaking of the strand controlling the path of the strand during transition from a completed package to an empty sleeve and controlling the individual rotative speeds of the collets to transfer the strand from a finished package to an empty sleeve without interrupting the attenuation of the streams to filaments.

A constant speed electrically energized motor 72 directly drives a rotor 74 which forms a component of an eddy current clutch or slip coupling 76. The eddy current clutch 76 includes a magnetically driven rotor or component 78 which establishes a direct drive to an alternator 80 of a type in which the frequency of the current generated by the alternator varies with its speed of rotation. The variable frequency, three phase current supplied by the alternator 80 is employed for driving motors 82, 84 and 86 which respectively operate or rotate the collets 32, 34 and 36. The circuits to the collet driving motors are individually controlled by relay actuated switch means 88, 90 and 92.

The relay actuating circuits for the switch means 88, 90 and 92 are connected to a master controller, timer or programmer 94. Connected with the controller 94 is a sensing means or timer for establishing the duration of winding of a package. If winding time is determinative of package size, the control means 96 may be a timer. If the number of revolutions of a sleeve determines package size, then the means 96 is a pulse sensing device or counter which electrically or mechanically summates the number of revolutions of the package sleeve for a completed package and initiates the indexing movement of the head 30.

The motor 40 for operating the indexing head 30 carrying the collets 32, 34 and 36 is actuated by a relay controlled switch means 98 connected with the controller 94. A tachometer generator 100 is driven by the shaft 79 connected with the alternator 80 and provides, through the medium of a rectifier 102, a voltage dependent upon the speed of the tachometer generator 100.

The eddy current clutch 76 includes an energizing coil 104 which is supplied with direct current connected to a Thyratron electronic control 106. The electronic control 106 is supplied with current through the conductors L1 and L2. The electronic control 106 is connected to a voltage summating means or differential amplifier 108.

The control circuit of the tachometer generator 100 includes a direct current supply through conductors designated L3 and L4 to a circuit incorporating a variable resistance 112, the movable arm for varying the resistance being driven by a synchronous motor 116 controlled by the controller 94. An adjustable resistance 115 is for the purpose of establishing a voltage range for the circuit of the variable resistance 112.

The circuit of the variable resistance 112 is adapted to supply a reference voltage through conductors 117 and 118 to a voltage summating means or differential amplifier 108. The function of the means 108 is to summate or differentiate the voltage of the tachometer generator circuit with the reference voltage supplied through the circuit embodying the variable resistance 112, the result of the summated voltages constituting the input of the Thyratron electronic control 106.

The voltage of the tachometer generator circuit normally maintains constant the current in the current coil 104 through the Thyratron control 106 to maintain the alternator 80 at a substantially constant speed. Hence a change in voltage supplied to the Thyratron control 106 modifies the current supplied to coil 104 of the coupling 76. To obtain a proper summated voltage to the Thyratron control, the circuit of the tachometer generator is of a negative potential and the circuit of the resistance 112 of a positive potential.

The function of the Thyratron electronic control 106 is to vary the current supplied to the direct current coil 104 of the eddy current clutch or coupling 76 in accordance with the variations of the summated input voltage established in the Thyratron electronic control 106 from the voltage summating means 108. The rotation of the arm 114 of the variable resistance 112 is correlated with the period of the start of winding of a package to the completion of the package to continuously vary the resistance in the reference voltage circuits 117, 118 to thereby vary the current supplied to the direct current coil 104 of the eddy current clutch 76 to vary the speed of the alternator 80.

By continuously varying the current supplied to the current coil 104 of the eddy current clutch 76 in the manner above described, the magnetic flux in the clutch 76 is continuously varied during a package forming operation whereby the speed of the driven component 78 of the clutch, connected with the alternator 80, is continuously varied, even though the component 74 of the clutch is driven by the motor 72 at a constant speed.

Thus through the variable speed of the alternator 80, the collet motor, driving a sleeve upon which a package is being formed, is rotated at a variable speed dependent upon the frequency of the current supplied by the alternator 80.

The establishment of a variable speed for the collet of the package being wound continuously and progressively reduces the speed of the package sleeve as the package builds up to a larger diameter so that the filaments are attenuated at a substantially constant speed irrespective of the progressively increasing diameter of the package being formed so that the filaments are of substantially the same size throughout the entire package.

A motor diagrammatically illustrated at 125 is arranged to rotate and reciprocate the traverse means 46 and is actuated by current supplied through the controller 94.

The strand engaging arm or rod 60 provided with the strand engaging projection or hook-like means 62 may be reciprocated by an electrically energized motor 126 or other suitable means controlled by the master controller 96 to be brought into operation at the completion of a formed package for engaging and moving the strand 18 out of the groove 50 in the traverse member 48 and out of the path or beyond the limit of reciprocatory movement of the traverse in a left-hand direction as viewed in FIGURE 2 during transfer of the strand 18 from a completed package onto an empty sleeve carried by a succeeding collet.

The means in the controller 94 for controlling the sequence of operation or actuation of the collet driving motors is actuated through the timer or sensing means 96. One of the functions of the timer controller 94 is to initiate rotation of a collet carrying an empty sleeve to bring the sleeve up to proper speed during the final stage of completion of the package so that when the completed package is indexed away from winding position, the empty sleeve moved into winding position will be rotating at the same speed as that of the sleeve of the completed package to effect a transfer of the strand to the empty sleeve.

The range of speed of a collet during the start of a package and the completion of a package is dependent upon the diameter of the collector or sleeve and the size or extent of build up of the completed package. A sleeve is usually of a diameter of about six and one-half inches or more. In the explanation of the method it is arbitrarily assumed that the speed of rotation of a collet and sleeve at the start of formation of a package is 14,000 r.p.m. and that the speed of rotation of the sleeve at the completion of a package is 11,000 r.p.m.

During the formation or winding of a package, only a minor number of initial turns or convolutions of strand are wound on the outer edge region or transfer station of the collector sleeve surface or the strand may be wound on the surface of the projecting end of the collet until the strand has moved through the reentrant slot 56 following retraction of the guide rod 60 and into the groove 50 in the traverse member 48, the strand being then guided and distributed on the collector by the rotation and reciprocation of the traverse means 46.

The completed package is rotating at its lowest speed viz 11,000 r.p.m. and it is necessary that the speed of the empty sleeve and the sleeve of the completed package be rotated at substantially identical speeds during the transfer of the strand from a completed package onto the empty sleeve. Thus when the reciprocating rod 60 lifts or moves the strand out of the groove 50 of the traverse, it carries the strand adjacent the left-hand end zone of the collector sleeve 42 as viewed in FIGURE 2 to wind a small amount of strand on the end region of the collector at the speed of the collector sleeve, viz 11,000 r.p.m. The empty sleeve 42a about to be moved to the winding station must be brought up to the speed of 11,000 r.p.m. before it is indexed into package forming position.

With particular reference to FIGURES 1, 6, 7 and 8 and the circuit diagram of FIGURE 9, the sequence of operations or steps in the method occur as follows: In FIGURE 1 a package is being formed on the sleeve 42 carried by the collet 32 and the strand 18 is guided onto the sleeve by the combined rotation and reciprocation of the traverse means 46, the rod 60 being in its retracted position out of the path of the strand 18.

FIGURE 6 is illustrative of the position of the components as the package 64 wound on the sleeve 42a is nearing completion and the motor 82 illustrated schematically in FIGURE 9 is rotating at a speed approaching its minimum of 11,000 r.p.m. through reduced speed of the alternator 80 in a manner hereinafter explained.

When the strand package 64 is almost completed, the timer or sensing means 96, responsive to time or the number of revolutions of the package, triggers the master controller 94 shown schematically in FIGURE 9, to sequentially initiate and control the cycle of operations.

The controller or programmer 94 first actuates the relay operated switch means 92 to cause energization of the motor 86 driving the collet 36 carrying the empty or unoccupied sleeve 42a shown in FIGURE 6 by current supplied by the alternator 80. With a sleeve of a size of about six and one-half inches in diameter about one minute is required to bring the speed of the collet driving motor 86 up to 11,000 r.p.m. or a speed equal to the rotation of the collet 32 at the completion of the package 64.

In this manner the sleeve carrying the package 64 and the empty sleeve 42a are rotating at substantially identical speeds just prior to an indexing operation so as to effect a transfer of the strand 18 from the completed package to the rotating sleeve 42a without any appreciable differential in linear speed of the strand 18. The controller 94 then sets into operation the motor 126 to project the arm 60 carrying the hook-like member 62 in a left-hand direction as viewed in FIGURE 2 causing the hook-like member 62 to engage and withdraw the strand 18 radially of the traverse means out of contact with the groove 50 in the traverse member 48.

At this stage wherein the strand 18 is disengaged from the traverse and is being wound at the transfer station or region upon the end region of the sleeve 42 or upon the exposed surface of the collet, the controller 94 causes actuation of the relay operated switch means 98 to energize the indexing motor 40 indexing the head 30 in a clockwise direction as viewed in FIGURES 6, 7 and 8, through one-third of a revolution moving the completed package 64 toward the position shown in FIGURE 7 and the fresh sleeve 42a on the collet 36 toward the winding position or winding station.

At the instant the indexing head 30 is moved toward the position illustrated in FIGURE 7, the programmer or controller 94 causes operation of the switch means 88 to deenergize the collet driving motor 82, initiating a slowing down of the rotation of the completed package 64. At the time of deenergization of the motor 82 driving the completed package, a braking means is applied to rapidly reduce the speed of rotation of the package 64. This is accomplished through the controller 94 which actuates switch means 95 associated with the controller to connect a supply of direct current DC through conductors a and a', shown in FIGURE 9, to the stator of the motor 82 and thereby set up electramagnetic forces effective to quickly reduce the speed of the motor 82. The motors 84 and 86 are likewise reduced in speed when packages thereon have been completed through the switch means 94 arranged to connect direct current through conductors b, b' and c, c', shown in FIGURE 9, to the stators of motors 84 and 86 respectively.

Other braking means such as brake shoes may be employed for the purpose but the use of direct current of comparatively high amperage through the stator of the motor is found to be very effective. As the fresh sleeve 42a is moved toward winding position and is rotating at 11,000 r.p.m. and as the package 64 is rapidly slowing down under the influence of braking forces, a slack in the strand forming the loop 66 occurs between the empty sleeve 42a and the completed package 64 causing a strand loop 66 to form as indicated in FIGURE 8.

As the loop of strand adjacent the periphery of the end region of sleeve 42a is in slack condition, the strand adheres or "licks" to the periphery of the sleeve 42a and the slack strand initially wound upon the edge region of the sleeve 42b.

As the winding of the strand 18 continues on the empty sleeve 42a, the strand loop is snubbed by succeeding convolutions on the sleeve 42a, setting up tension in the connecting straind portion between the finished package and the strand on the sleeve 42a which breaks the strand at a point between the package 64 and sleeve 42a thus freeing the completed package 64 which continues to slow down until it comes to rest, at which time the completed package 64 is in indexed position away from the winding station. The completed package is slidably removed from the collet 32 and an empty or strand-free sleeve telescoped over the collet 32.

At the time of completion of the package 64, the collet 32 supporting the package is rotating at its minimum of 11,000 r.p.m. and at the time of transfer of the strand 18 onto the empty sleeve 42a, this sleeve is rotating at substantially the same speed viz. 11,000 r.p.m. so that a transfer of the strand 18 is effected without any differential in its linear speed. In order to restore the attenuated filaments to the desired size for forming the new package, the empty sleeve 42a in winding position must be brought up to 14,000 r.p.m. as soon as possible after it is in winding position.

At the time the motor 40 is energized to index the head 30 from the position shown in FIGURE 6 toward the position shown in FIGURES 7 and 8, the arm 114 of the variable resistance 112 in the reference voltage circuit, being driven by the synchronous motor 116, is at the start of its movement in a counterclockwise direction as viewed in FIGURE 9 to progressively increase the resistance and hence the voltage in the reference voltage circuit which is of a positive potential impressed through conductors 117 and 118 to the differential or voltage summating amplifier 108.

The tachometer generator 100 sets up a negative potential through the rectifier 102 which is summated with the reference voltage or positive potential impressed in the amplifier 108, the summated voltage being the input supplied to the Thyratron electronic control 106 which, under the influence of the summated voltage, supplies the maximum direct current to the current coil 104 of the eddy current clutch or magnetic coupling 76.

By increasing to a maximum the direct current supplied to the current coil 104, the magnetic flux is increased to its maximum and the slip in the clutch or coupling 76 reduced to a minimum, a condition which increases the speed of the tachometer generator 100 and the alternator 80 to their maximum. The increase in speed in the alternator 80 increases the frequency of the three phase current supplied by the alternator to the collet motor 86 which drives the collet 36 upon which the empty sleeve 42a is mounted.

In this manner the motor 86 is brought up to a speed of 14,000 r.p.m. within a comparatively short space of time. It has been found that with a collet sleeve of a diameter of about six and one-half inches that a period of about nine seconds is required to increase the speed of the sleeve 42a from 11,000 r.p.m. to standard winding speed of 14,000 r.p.m. for the sleeve 42a. This increase in speed of sleeve 42a to its maximum speed of rotation reestablishes the standard linear speed at which the filaments of the strand 18 are attenuated by being wound upon the fresh sleeve 42a.

At the start of winding of the strand 18 upon the end region of the fresh sleeve 42a, the strand is guided onto this region of the sleeve by the rod 60 which is still in projected position. The controller 94 then initiates operation of the motor 126 or other means to cause the rod 60 to be retracted in a right-hand direction as viewed in FIGURE 2 toward the housing 28. The strand 18 follows the retracting movement of the rod 62 until the strand reaches a region of the reentrant slot 56 in the rotating traverse member 48 which is rotating in a counterclockwise direction.

The strand 18 enters the reentrant slot 56 into the groove 50 and, thereafter by reason of the rotation and reciprocation of the traverse member 48, the strand is wound upon the collector sleeve 42a in a series of overlapping helixes and such pattern of winding distributed lengthwise of the sleeve under the influence of the reciprocatory movements of the traverse member 48.

As the strand package on the sleeve 42a is built up during continued winding of the strand in the manner above described, the synchronous motor 116 drives the arm 114 of the variable resistance 112 to progressively increase the resistance in the reference voltage circuit as the diameter of the strand package increases. By progressively increasing the reference voltage in the reference voltage circuit 117, 118, the input through the differential or voltage summating amplifier 108 to the Thyratron electronic control 106 effects a progressively decreasing amount of current delivered to the direct current coil 104 and correspondingly decreases the magnetic flux effective in the eddy current clutch 76.

The progressive reduction in magnetic flux in the eddy current clutch 76 increases the amount of slippage between the driving and driven components 74 and 78 of the clutch 76 to progressively reduce the speed of the tachometer generator 100 and the alternator 80 thus progressively decreasing the frequency of the output current from the alternator to the collet driving motor 86 rotating the sleeve 42a upon which the new package is being formed.

In this manner the motor 86 driving the sleeve 42a is progressively reduced in speed from 14,000 r.p.m. at the start of the formation of the new package to its minimum speed of 11,000 r.p.m. at or nearing of completion of the new package on the sleeve 42a.

While the tachometer generator 100 is progressively decreasing in speed and varying the voltage supplied to the summating amplifier 108, the reference voltage, through the progressive insertion of resistance in the reference voltage circuit 117, 118, is correspondingly increased so that the input from the amplifier 108 to the electronic control 106 effects a progressive decrease in direct current supplied to the coil 104 of the eddy current clutch 76.

The voltage adjusting means 115 may be regulated to establish the base reference voltage in the reference voltage circuit 117, 118 to thereby control the current flow to the coil 104 of the eddy current clutch 76 and predetermine the range of speed of rotation of the alternator 80 and hence the maximum and minimum speeds of rotation of the collect driving motors 82, 84 and 86.

When the package being formed on the sleeve 42a is nearing completion, the motor 84 adapted to drive the collet 34 carrying the empty sleeve 42b is energized through the controller or programmer 94 about one minute prior to the completion of the package on the sleeve 42a preparatory to on indexing operation of the head 30 which will move the sleeve 42b into winding position and the completed package on sleeve 42a away from winding position in the manner hereinabove explained, and the cycle of operations repeated.

It will thus be apparent from the foregoing, that the attenuation of the filaments is continuous and is carried on without interruption of the attenuating operation thereby assuring more uniform filaments.

Through this method of winding, the only portion of the attenuated strand which is not of the standard size and hence becomes waste, is that amount of strand wound upon the end region of the sleeve of a completed package under the influence of the rod 60 guiding the strand out of the traverse and onto the end region of such sleeve, and the initial amount of strand wound onto the empty sleeve which is moved into winding position during the period of time that the sleeve upon which a package is started is increased in rotation from 11,000 r.p.m. to 14,000 r.p.m. or the amount of strand that is wound on the sleeve in about nine seconds viz. the time required to bring the sleeve to its maximum speed of rotation in the formation of a new package.

The baffles 130 carried by the indexing head 30 and extending in the spaces between adjacent collets on the indexing head 30 serve to prevent the moisture on the strand on the sleeve in winding position being thrown by centrifugal forces onto the newly formed package which has just been removed from the winding station. While in the embodiment illustrated herein, each collet supports a single sleeve for forming a package, it is to be understood that the collets may be extended in length so as to accommodate two or more sleeves on a single collet in which arrangement a traverse member is provided for each sleeve.

The contactors and circuit controlling means for selectively energizing the collet driving motors, the indexing motor for the collet carrier 30, the means for effecting periodic movement of the pusher rod or strand guide 60 and the control of the traverse actuating motor or means 125 and the synchronous motor 116 are contained within the master controller or programmer 94.

Where it is desired to wind a limited number of superposed layers of strand upon a restricted areas of a packaging sleeve for use as a signal or flag for subsequent twisting or processing operations, this may be accomplished by means incorporated in the programmer or controller 94 for interrupting reciprocation of the traverse member 48 near the start of the formation of a new package on a fresh sleeve. By interrupting the reciprocatory movement of the traverse member 48 for a limited period of time, the strand 18 is guided by the uniform motion action of the groove 50 during rotation of the traverse member 48 to form a plurality of superposed layers of strand spanning an area of the collector sleeve equal to the throw of the cam groove 50 in the traverse member. This operation may be continued for a period of time necessary to build up the desired number of superposed layers of convolutions of the strand on a limited area of the sleeve. The signal or flag provided by the superposed layers on the restricted area provides a means for visually indicating to an operator of an approaching end of the package during operations involving unwinding the collected strand from the package.

It is apparent that, within the scope of the invention, modifications and different arrangements may be made other than as herein disclosed, and the present disclosure is illustrative merely, the invention comprehending all variations thereof.

We claim:

1. The method of continuously collecting linear material on wound packages including rotating a first collector, winding the material on the first collector, distributing the material in superposed layers over a major area of the first collector to form a completed package, rotating a second collector at substnatially the same peripheral speed as that of the first collector at the period of completion of a package on the first collector, diverting the advancing linear material to a transfer region spaced from the package winding region of the collector, engaging the advancing linear material with the second rotating collector at the transfer region, and establishing a differential in the peripheral speeds of the collectors to form a slack region of the material whereby the material of the slack region adheres to the second collector effecting fracture of the material at the transfer region to free the completed package from the advancing linear material, and redirecting the linear material onto the package winding region of the second collector.

2. The method of continuously collecting linear material on wound packages including rotating a first surface, winding the material on the first surface over a major area of the first surface to form a completed package, rotating a second surface at substantially the same peripheral speed as that of the first surface at the period of completion of a package on the first surface, diverting the advancing linear material to a transfer station to wind the material on a minor area of the first surface spaced from the package winding area thereof, engaging the advancing linear material with the second rotating surface at the transfer staton, and establishing a differential in the peripheral speeds of the surfaces to form a slack region of the material whereby the material of the slack region adheres to the second surface effecting fracture of the material between the surfaces at the transfer station to free the completed package from the advancing linear material, and redirecting the linear material onto the package winding region of the second surface.

3. The method of continuously collecting linear material on wound packages including rotating a first surface, winding the material on the first surface, traversing the material during winding to form superposed layers of the material on the first surface to form a package, rotating a second surface, diverting the advancing linear material from the traversing region to a transfer region spaced from the package winding region of the first surface, engaging the advancing linear material with the second rotating surface at the transfer region, establishing a differential in the peripheral speeds of the surfaces to form a slack region of the material whereby the material of the slack region adheres to the second surface effecting fracture of the material at the transfer region to free the package from the advancing linear material from the transfer region, redirecting the linear material to the traversing region, and winding the material on the second surface in superposed layers at a region spaced from the transfer region to form a package.

4. The method of continuously collecting linear material on wound packages including rotating a first surface, winding the material on the first surface, traversing the material during winding to form superposed layers of the material on the first surface to form a package, rotating a second surface at substantially the same peripheral speed as that of the first surface at the period of completion of a package on the first surface, diverting the advancing linear material from the traversing region to a transfer region spaced from the package winding area of the first surface, transferring the linear material onto the second rotating surface at the transfer region, establishing a differential in the peripheral speeds of the surfaces while the linear material is at the transfer region to form a slack region of the material whereby the material of the slack region adheres to the second surface effecting fracture of the material between the surfaces at the transfer station to free the completed package from the advancing linear material, and redirecting the advancing linear material from the transfer region to the traversing region.

5. The method of continuously collecting linear material on wound packages including the steps of rotating a first collector, winding the linear material on the collector, concomitantly traversing the linear material to distribute the material over a major area of the collector to build up the material in superposed layers to form a completed package, rotating a second collector at substantially the same speed as that of the first collector at the period of completion of a package on the first collector, diverting the linear material from the package winding region of the first collector to a transfer station, engaging the continuously advancing linear material with the second collector at the transfer station, establishing a differential in rotative speeds of the collectors to form a slack region of the material whereby the material at the slack region adheres to the second collector effecting fracture of the material between the collectors, increasing the speed of rotation of the second collector, redirecting the advancing linear material from the transfer region to the traversing region, and winding the linear material on the second collector at a package winding region spaced from the transfer station and traversing the linear material to distribute the same in superposed layers.

6. The method of continuously collecting linear material on wound packages including the steps of rotating a first collector, winding the linear material on the collector, concomitantly traversing the linear material to distribute the material over a major area of the collector to build up the material in superposed layers to form a completed package, progressively reducing the speed of the first collector as the package increases in size to maintain a substantially constant linear speed of the linear material, rotating a second collector at substantially the same speed as that of the first collector at the period of completion of a package on the first collector, guiding the linear material to a transfer station spaced from the package winding region of the first collector, winding the material at the transfer station on to a minor area of the first collector, engaging the continuously advancing linear material with a minor area of the second collector at the transfer station, establishing a differential in rotative speeds of the collectors to form a slack region of the material whereby the material at the slack region adheres to a minor area of the second collector effecting fracture of the material between the collectors, increasing the speed of rotation of the second collector, redirecting the advancing linear material to the traversing region, and winding the linear material on the second collector at a package winding region thereof spaced from the transfer region and traversing the linear material to distribute the same in superposed layers.

7. The method of continuously collecting linear material on wound packages including rotating a first surface, winding the material on the first surface, traversing the material as it is wound on the first surface to form a package, rotating a second surface while continuing rotation of the first surface, disengaging the advancing linear material from the traverse, engaging the advancing linear material with the second rotating surface, establishing a differential in the peripheral speeds of the surfaces to form a slack region of the material whereby the material of the slack region is snubbed by successive convolutions of the material onto the second surface effecting fracture of the material between the surfaces, reengaging the advancing linear material with the traverse, and winding the material on the second surface and traversing the material to distribute the same in superposed layers.

8. A method of forming and collecting filaments of heat-softenable material including the steps of flowing streams of the material from a supply, rotating a first surface at a winding station, winding a strand of filaments formed from the streams onto the surface to attenuate the streams to filaments at a predetermined speed and form a package, progressively reducing the speed of rotation of the first surface as the package of the strand on the collector increases in size, rotating a second surface, diverting the advancing strand at the completion of a package to a strand transfer position spaced from the package winding region of the first surface, simultaneously transferring the first surface and completed package away from the winding station and the rotating second surface to the winding station, reducing the speed of the completed package to establish a slack region in the continuously advancing strand causing the slack region of the strand to adhere to and be snubbed by successive convolutions onto the second surface at the winding station and thereby effect fracture of the strand adjacent the completed package, retracting the strand from the transfer position, and winding the strand on the package winding region of the second surface at the winding station.

9. A method of forming and collecting fibers of heat-softenable material including the steps of flowing streams of the material from a supply, rotating a first collector at a winding station, winding a strand of filaments formed from the streams onto the first collector to attenuate the streams to filaments at a predetermined speed, traversing the strand during winding to collect the strand in superposed layers to form a package, progressively reducing the speed of rotation of the first collector as the package of the strand on the collector increases in size, rotating a second collector, diverting the moving strand to a strand transfer station spaced from the package winding region of the first collector at the completion of a package, moving the first collector and the completed package away from the winding station and the rotating second collector into the winding station, reducing the speed of the first collector and package to establish a loop in the continuous strand and cause the strand to adhere to and be snubbed by successive convolutions onto the second collector at the transfer station to effect fracture of the strand adjacent the completed package, retracting the strand from the strand transfer station, and simultaneously winding and traversing the advancing strand on the package winding region of the second collector at the winding station.

10. A method of forming and collecting filaments of heat-softenable material including the steps of flowing streams of the material from a supply, rotating a collector at a winding station, winding a strand of filaments formed from the streams onto the collector and winding the strand thereon to attenuate the streams to filaments at a predetermined speed, distributing the strand during winding in superposed layers on the collector to form a package, progressively reducing the speed of rotation of the collector as the package of the strand on the collector increases in size, rotating a stand-by collector, diverting the moving strand to a strand transfer position spaced from the package winding region of the first collector at the completion of a package, simultaneously indexing the completed package away from the winding station and the rotating stand-by collector into the winding station, reducing the speed of the completed package to establish a loop in the continuous strand between the collectors and cause the strand to adhere to and be snubbed onto the collector at the transfer position to effect fracture of the strand adjacent the completed package, retracting the strand from the strand transfer position, increasing the speed of rotation of the collector at the winding station to attenuate the filaments to predetermined size, and simultaneously winding the strand and distributing the strand in superposed layers on the package winding region of the collector at the winding station.

11. Apparatus of the character disclosed, in combination, a frame, an indexable head journaled on said frame, a plurality of winding collets journally supported on said head, means for indexing said head to bring said collets successively to a winding station, driving means individual to each collet for rotating the same, each of said collets being adapted to support a collector upon which a textile element is to be wound to form a package, a traverse means for distributing the textile element on the collector in overlapping helixes, said traverse means being rotatable and reciprocable, means effective to transfer the textile element into engagement with the succeeding collector as it is moved into position at the winding station, means for initiating rotation of the collets, means for varying the speed of the collet and collector at the winding station during a winding operation to progressively reduce the speed thereof as the package is increased in size by winding the element on the collector, and braking means for rapidly decreasing rotation of the completed package at the time of indexing the head to effect a fracture of the element adjacent the package.

12. Apparatus of the character disclosed, in combination, a frame, an indexable head journaled on said frame, a plurality of winding collets journally supported on said head, means for indexing said head to bring said collets successively to a winding station, driving means individual to each collet for rotating the same, each of said collets being adapted to support a collector upon which a textile element is wound to form a package, a traverse means including a cylindrically shaped member, a continuous cam groove formed in the periphery of the member to receive the textile element, said cylindrically shaped traverse member being rotatable and reciprocable for guiding and distributing the element on a collector at the winding station, one end region of the traverse member being formed with a reentrant slot in communication with the cam groove in the number, a rod arranged for movement into contact with the textile element for disengaging the element from the groove in the traverse member upon completion of a package, means for initiating rotation of the collets, means for varying the speed of the collet at the winding station during a winding operation to progressively reduce the speed thereof as the package is increased in size by winding the element on the collector at the winding station, means for establishing differential in speed of rotation of the collector bearing the completed package and the succeeding collector as the textile element engages the succeeding collector to effect a fracture of the textile element adjacent the package, said rod being retractable to facilitate reengagement of the textile element with the groove in the traverse member through the reentrant slot.

13. Apparatus of the character disclosed, in combination, a frame, an indexable head journaled on said frame, a plurality of winding collets journally supported on said head, means for indexing said head to bring said collets successively to a winding station, driving means individual to each collet for rotating the same, each of said collets being adapted to support a collector upon which a continuously advancing linear element is to be wound, a rotatable and reciprocable cylindrically shaped traverse means formed with a peripheral groove to receive the element for distributing the element on a collector at the winding station to form a wound package, a member arranged for movement into contact with the element for disengaging the element from the traverse means and engage the element with a succeeding collector, said traverse means being formed with a reentrant slot to receive the element, means for initiating said driving means for rotating the collets, and means for regulating the speed of the driving means for the collet at the winding station during a winding operation to progressively reduce the speed thereof as the package is increased in size by winding the element on the collector at the winding station.

14. Apparatus for packaging advancing linear material, in combination, a winding station, a plurality of rotatable winding collets, means for successively moving said collets to the winding station, driving means individual to each collet for rotating the same, each of said collets being adapted to support a collector upon which the linear material is collected by winding, a rotatable and reciprocable traverse means engageable with the material for distributing the material on a collector at the winding station to form a wound package, means arranged to effect disengagement of the material from the transverse means, means for moving a succeeding rotating collet and empty collector to the winding station whereby the advancing linear material engages the empty collector, means for reducing the speed of the collet supporting the wound package to establish a slack region of the linear material whereby the slack material is wound on the succeeding collector at the winding station setting up tension to break the linear material adjacent the package, said movable member being retractable to reengage the advancing linear material with the traverse means to distribute the material as it is wound on the collector at the winding station.

15. Apparatus for forming and collecting continuous filaments from heat-softened material including, in combination, a rotatable collet, said collet adapted to support a collector upon which a group of filaments is wound, a first electrically energizable motor adapted to rotate the collet, a variable speed alternator arranged to supply current to the collet driving motor, a second electrically energizable motor adapted to rotate at a substantially constant speed, means connecting the second motor with the alternator including an electromagnetic slip coupling, a control circuit for said electromagnetic slip coupling, programming means for varying characteristics of the control circuit to modify the effectiveness of said electromagnetic coupling to reduce the speed of the alternator whereby to reduce the speed of the collet driving motor as the package of filaments increases in size on the collector to maintain the linear speed of the filaments substantially constant whereby to form filaments of uniform size.

16. Apparatus for forming and collecting continuous filaments from heat-softened material including, in combination, a plurality of rotatable winding collets, an indexable head supporting said collets and movable to bring the collets successively to a winding station, means for indexing said head at the completion of a wound package, each collet being adapted to support a collector upon which a group of filaments is wound to form a package, an electrically energizable motor individual to each collet for rotating the collet, a variable speed alternator arranged to supply current to the collet driving motors, a constant speed electrically energizable motor, means connecting the constant speed motor with the alternator including an electromagnetic slip clutch, a voltage circuit, means including a programmer arranged to vary the voltage in the voltage circuit, means responsive to the varying voltage in said voltage circuit for controlling the effectiveness of said electromagnetic slip clutch for varying the speed of the alternator whereby to reduce the speed of the motor driving the collet at the winding station as the package of filaments increases in size on the collector to maintain the linear speed of the filaments substantially constant whereby to form filaments of uniform size.

References Cited in the file of this patent

UNITED STATES PATENTS

| | | |
|---|---|---|
| 2,131,148 | Siegenthaler | Sept. 27, 1938 |
| 2,219,020 | Reiners | Oct. 22, 1940 |
| 2,244,851 | Reiners | June 10, 1941 |
| 2,245,305 | Siegenthaler | June 10, 1941 |
| 2,433,304 | Stream | Dec. 23, 1947 |
| 2,508,150 | Fennell | May 16, 1950 |
| 2,634,386 | Pell | Apr. 7, 1953 |
| 2,663,507 | Soussloff | Dec. 22, 1953 |
| 2,676,762 | Baker | Apr. 27, 1954 |
| 2,779,545 | Hauck et al. | Jan. 29, 1957 |
| 2,846,157 | Stephens | Aug. 5, 1958 |

FOREIGN PATENTS

| | | |
|---|---|---|
| 836,664 | France | Oct. 17, 1938 |
| 830,308 | Germany | Feb. 4, 1952 |
| 295,010 | Switzerland | Feb. 16, 1954 |
| 1,145,710 | France | May 13, 1957 |